United States Patent
Tsirkin et al.

(10) Patent No.: US 9,824,032 B2
(45) Date of Patent: Nov. 21, 2017

(54) GUEST PAGE TABLE VALIDATION BY VIRTUAL MACHINE FUNCTIONS

(71) Applicant: Red Hat Israel, Ltd., Raanana (IL)

(72) Inventors: Michael Tsirkin, Yokneam Yillit (IL); Paolo Bonzini, Turate (IT)

(73) Assignee: Red Hat Israel, Ltd., Raanana (IL)

( * ) Notice: Subject to any disclaimer, the term of this patent is extended or adjusted under 35 U.S.C. 154(b) by 70 days.

(21) Appl. No.: 14/688,628

(22) Filed: Apr. 16, 2015

(65) Prior Publication Data
US 2016/0306749 A1    Oct. 20, 2016

(51) Int. Cl.
G06F 12/14    (2006.01)
G06F 9/455    (2006.01)

(52) U.S. Cl.
CPC ........ *G06F 12/145* (2013.01); *G06F 9/45558* (2013.01); *G06F 2009/45583* (2013.01); *G06F 2212/1052* (2013.01)

(58) Field of Classification Search
CPC ............... G06F 12/145; G06F 9/45558; G06F 2009/45595; G06F 2212/1052
See application file for complete search history.

(56) References Cited

U.S. PATENT DOCUMENTS

| | | |
|---|---|---|
| 7,124,237 B2 | 10/2006 | Overton et al. |
| 8,656,482 B1 | 2/2014 | Tosa et al. |
| 2008/0244155 A1* | 10/2008 | Lee ........................ G06F 12/145 711/6 |
| 2013/0091568 A1 | 4/2013 | Sharif et al. |
| 2013/0276057 A1 | 10/2013 | Smith et al. |
| 2014/0013326 A1 | 1/2014 | Neiger et al. |
| 2014/0025795 A1 | 1/2014 | Fiennnes |
| 2014/0173628 A1 | 6/2014 | Ramakrishnan |
| 2014/0380009 A1* | 12/2014 | Lemay .................. G06F 12/145 711/163 |

OTHER PUBLICATIONS

Sharif, Monirul, et al., "Secure In-VM Monitoring Using Hardware Vituralization", PowerPoint Presentation, Nov. 9-13, 2009, 22 pages http://research.microsoft.com/pubs/153179/sim-ccs09.pdf.

(Continued)

*Primary Examiner* — Eric S Cardwell
(74) *Attorney, Agent, or Firm* — Lowenstein Sandler LLP

(57) ABSTRACT

Systems and methods for guest page table validation by virtual machine (VM) functions. An example method comprises: storing a first VM function invocation instruction in a first memory page executable from a default memory view of a VM, wherein executing the first VM function invocation instruction switches a page table pointer to a trampoline memory view of the VM; configuring a write access permission, from the trampoline memory view, to a page table comprised by a VM page table hierarchy; storing a second VM function invocation instruction in a second memory page executable from the trampoline memory view, wherein executing the second VM function invocation instruction switches the page table pointer to an alternative memory view of the VM; storing, in the second memory page, validation instructions to validate the VM page table hierarchy; and storing protected instructions within a third memory page executable from the alternative memory view.

20 Claims, 5 Drawing Sheets

(56) References Cited

OTHER PUBLICATIONS

Petersson, Mats, "Re: CR3 Virtual Address", xen.org, Nov. 28, 2012, 3 pages http://comments.gmane.org/gmane.comp.emulators.xen.devel/144721.
Tsirkin, Michael, and Bonzini, Paolo, "Position Dependent Code in Virtual Machine Functions", U.S. Appl. No. 14/596,359, filed Jan. 14, 2015.
Sharif, Monirul et al., "Secure In-VM Monitoring Using Hardware Virtualization", CCS, Nov. 9-13, 2009, Chicago, IL 33 pages http://adl.tw/adlab/ppt/259_Secure%20In-VM%20Monitoring%20Using%20Hardware%20Virtualization.pptx.

* cited by examiner

| Memory pages | Default view 210 | Trampoline view 220 | Alternative view 230 |
|---|---|---|---|
| Guest code and data 240 | Read/Write/Execute | -/-/- | Read/Write/- |
| VMFUNC page tables 250 | Read/-/- | Read/Write/- | Read/Write/- |
| First trampoline page 260 | Read/Write/Execute | -/-/- | Read/Write/Execute |
| Second trampoline page 270 | -/-/- | Read/-/Execute | -/-/- |
| Entry point page 280 | -/-/- | R/-/- | Read/-/Execute |
| | | | |

GUEST PAGE TABLE VALIDATION BY VIRTUAL MACHINE FUNCTIONS

TECHNICAL FIELD

The present disclosure is generally related to virtualized computer systems, and is more specifically related to systems and methods for guest page table validation by virtual machine functions.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates several virtual machine memory views that may be configured in accordance with one or more aspects of the present disclosure.

DETAILED DESCRIPTION

Figure 1:
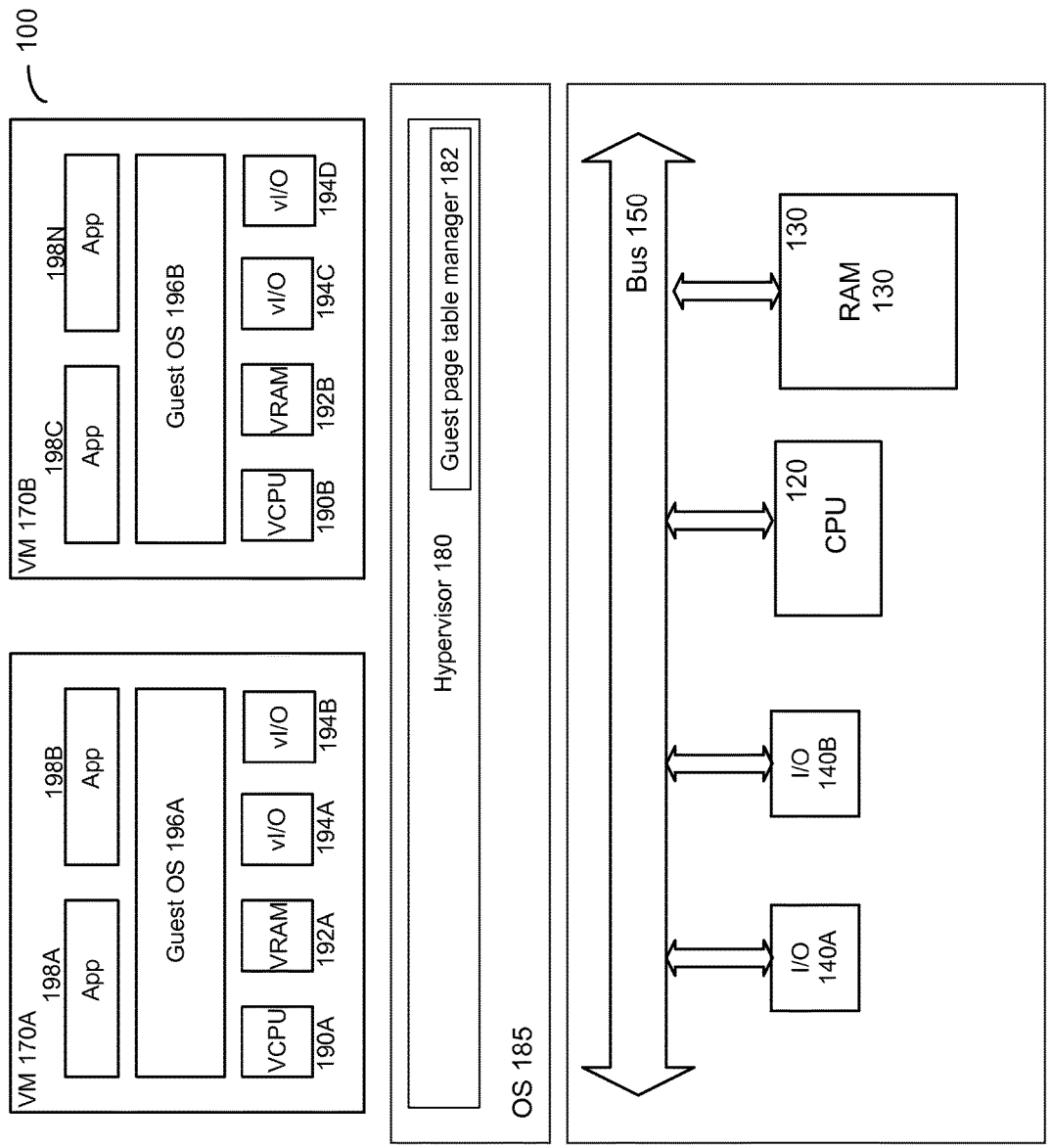
FIG. 1 depicts a high-level component diagram of an example computer system implementing the methods for guest page table validation by virtual machine functions, in accordance with one or more aspects of the present disclosure.

Described herein are methods and systems for guest page table validation by virtual machine functions.

Certain processor architectures support virtualization by providing special instructions for facilitating virtual machine execution. In certain implementations, a processor may support executing a hypervisor (also referred to as "virtual machine monitor") that acts as a host and has full control of the processor and other platform hardware. A hypervisor presents a virtual machine with an abstraction of one or more virtual processors. A hypervisor is able to retain selective control of processor resources, physical memory, interrupt management, and input/output (I/O). Each virtual machine (VM) is a guest software environment that supports a stack consisting of operating system (OS) and application software. Each VM operates independently of other virtual machines and uses the same interface to the processors, memory, storage, graphics, and I/O provided by a physical platform. The software executing in a virtual machine is executed at the reduced privilege level so that the hypervisor can retain control of platform resources. A transition from the reduced privilege level (also referred to as VMX non-root operation in certain processor architectures) to the hypervisor context is referred to as a VM exit and may be performed by invoking a special Instruction Set Architecture (ISA)-dependent instruction (e.g., VMCALL).

A VM function is a privileged processor operation that can be invoked by a virtual machine without performing a VM exit. VM functions may be enabled and configured by the settings of certain fields in the Virtual Machine Control Structure (VMCS). A virtual machine may invoke a VM function by using a special ISA-dependent instruction (e.g., VMFUNC). A certain processor register (e.g., EAX) may be employed to select the specific VM function being invoked. Even though the VM function code does not run with elevated privileges, it may be granted access to some privileged resources, e.g., the hypervisor memory or memory of other VMs.

Another notable feature supported by certain hardware-assisted virtualization implementations is a second level address translation mechanism to facilitate guest-to host address translation. The guest operating system may maintain a page table hierarchy comprising the page directory and a set of page tables to facilitate the translation of virtual addresses into physical addresses. By treating a guest physical address as a host virtual address, the hardware page table walker can view the host page table as nested within the guest page table hierarchy.

In an illustrative example, guest applications being executed by a virtual machine may reference memory locations using guest virtual addresses. Responsive to receiving a memory access request, the processor may translate the referenced guest virtual address to a guest physical address using a guest page table that is managed by the guest operating system. The processor may then translate the guest physical address to the corresponding host physical address using an extended page table (EPT) that is managed by the hypervisor. The extended page table pointer (EPTP) field of the virtual machine control structure (VMCS) holds the physical address of the extended page table.

When executing a VM function, the host computer system controls the extended page table, but might not have control over the guest page table if the latter is writable by the guest operating system. Hence, the host has no control over the result of guest-to-host address translation, which may lead to undesired consequences.

Aspects of the present disclosure address the above noted and other deficiencies by providing methods and systems for guest page table validation by virtual machine functions. In accordance with one or more aspects of the present disclosure, the host memory may store certain code executable by a virtual machine, certain data accessible by the virtual machine, and guest page tables used by the virtual machine for the virtual address translation. The hypervisor may configure several memory views for the virtual machine, such that certain one or more memory views ("default views") would allow the virtual machine to execute the guest code and access the guest data, while one or more other memory views ("alternative views") would allow the virtual machine to execute certain protected code (e.g., to access a host memory allocated to a peer virtual machine for exit-less communications with the peer virtual machine). In certain implementations, the hypervisor may further configure one or more memory views ("trampoline views") in which the virtual machine is allowed to modify the VM function page tables.

In an illustrative example, the hypervisor may configure for the virtual machine a first memory view (also referred to as a "default view"), a second memory view (also referred to as a "trampoline view" to allude to its usage as an intermediate view from which a JMP instruction is executed to switch to the alternative view), and a third memory view (also referred to as an "alternative view"). The hypervisor may then configure several memory pages corresponding to the above referenced views, such that each memory page would have at least an execute permission in the respective view. The memory pages may occupy contiguous memory address ranges within each of the views.

The first memory page, which is executable from the default view, may comprise unprotected (i.e., guest-modifiable) guest-executable code. The last instruction of the first memory page may be a VM function invocation instruction to switch the extended page table pointer (EPTP) value, and thus transition to the trampoline view.

The second memory page, which is executable from the trampoline view, may comprise protected guest-executable code to perform certain integrity checks of the guest page table hierarchy. The last instruction of the second memory page may be a VM function invocation instruction to switch the extended page table pointer (EPTP) value, and thus transition to the alternative view.

The third memory page, which is executable from the alternative view, may comprise protected guest-executable code which may be employed to perform certain tasks (e.g., exit-less communication with a peer virtual machine).

Various aspects of the above referenced methods and systems are described in details herein below by way of examples, rather than by way of limitation.

FIG. 1 depicts a high-level component diagram of an illustrative example of a computer system 100 operating in accordance with one or more aspects of the present disclosure. Computer system 100 may include one or more processors 120 communicatively coupled to memory devices 130 and input/output (I/O) devices 140 via a system bus 150.

"Processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

Computer system 100 may run one or more virtual machines 170A-170B, by executing a software layer 180, often referred to as "hypervisor," above the hardware and below the virtual machines, as schematically illustrated by FIG. 1. In one illustrative example, hypervisor 180 may be a component of operating system 185 executed by host computer system 100. Alternatively, hypervisor 180 may be provided by an application running under host operating system 185, or may run directly on host computer system 100 without an operating system beneath it. Hypervisor 180 may abstract the physical layer, including processors, memory, and I/O devices, and present this abstraction to virtual machines 170A-170B as virtual devices. A virtual machine 170 may execute a guest operating system 196 which may utilize underlying virtual processors (also referred to as virtual central processing units (vCPUs)) 190, virtual memory 192, and virtual I/O devices 194. One or more applications 198A-198N may be running on a virtual machine 170 under guest operating system 196.

In various illustrative examples, processor virtualization may be implemented by the hypervisor scheduling time slots on one or more physical processors for a virtual machine, rather than a virtual machine actually having a dedicated physical processor. Device virtualization may be implemented by intercepting virtual machine memory read/write and/or input/output (I/O) operations with respect to certain memory and/or I/O port ranges, and by routing hardware interrupts to a virtual machine associated with the corresponding virtual device.

Processor 120 may support hardware-assisted virtualization by implementing a second level address translation mechanism to facilitate guest-to host address translation. Guest operating system 196 may maintain a page table hierarchy comprising the page directory and a set of page tables to facilitate the translation of virtual addresses into physical addresses. By treating a guest physical address as a host virtual address, the hardware page table walker of processor 120 can view the host page table as nested within the guest page table hierarchy.

In an illustrative example, guest application 198A may reference memory locations using guest virtual addresses (e.g., represented by guest linear addresses). Responsive to receiving a memory access request, the processor may translate the referenced guest virtual address to a guest physical address using a guest page table that is managed by guest operating system 196A. The processor may then translate the guest physical address to the corresponding host physical address using an extended page table (EPT) that is managed by hypervisor 180. Extended page table pointer (EPTP) field of the virtual machine control structure (VMCS) holds the physical address of the extended page table.

Processor 120 may further support hardware-assisted virtualization by providing special instructions for facilitating virtual machine execution, including one or more instructions facilitating execution of VM functions. A VM function is a privileged processor operation that can be invoked by a virtual machine without performing a VM exit. VM functions may be enabled and configured by the settings of certain fields in the Virtual Machine Control Structure (VMCS). A virtual machine may invoke a VM function by using a special ISA-dependent instruction (e.g., VMFUNC). A certain processor register (e.g., EAX) may be employed to select the specific VM function being invoked. Even though the VM function code does not run with elevated privileges, it may be granted access to some privileged resources, e.g., the hypervisor memory or memory of other VMs.

When executing a VM function, the host computer system controls the extended page table, but might not have control over the guest page table if the latter is writable by the guest operating system. Hence, the host has no control over the result of guest-to-host address translation, which may lead to undesired consequences.

In accordance with one or more aspects of the present disclosure, hypervisor 180 may include a guest page table manager component 182 which may perform the methods for guest page table validation by virtual machine functions, as described in more details herein below with reference to FIG. 2.

In certain implementations, guest page table manager component 182 may be implemented as a software component invoked by hypervisor 180, and may comprise one or more code modules that implement method 300 described herein below and various auxiliary functions. Alternatively, functions of guest page table manager component 182 may be performed by hypervisor 180.

The hypervisor may configure several memory views for the virtual machine, such that certain one or more memory views ("default views") would allow the virtual machine to execute the guest code and access the guest data, while one or more other memory views ("alternative views") would allow the virtual machine to execute certain protected code. In certain implementations, the hypervisor may further configure one or more memory views ("trampoline views") in which the virtual machine is allowed to modify the VM function page tables.

FIG. 2 schematically illustrates several virtual machine memory views that may be configured in accordance with one or more aspects of the present disclosure. As schematically illustrated by FIG. 2, the host memory may store certain code executable by a virtual machine, certain data accessible by the virtual machine, and guest page tables used by the virtual machine for the virtual address translation. The hypervisor may configure for the virtual machine a first memory view 210 (also referred to as a "default view"), a second memory view 220 (also referred to as a "trampoline view"), and a third memory view 230 (also referred to as an "alternative view"). The hypervisor may then configure several memory pages corresponding to the above referenced views, such that each memory page would have at least an execute permission in the respective view. The memory pages may occupy contiguous memory address ranges within each of the views.

FIG. 2 shows several memory pages that may be mapped into the address space of the virtual machine, including guest code and data pages 240, VMFUNC page tables 250, first trampoline page 260, second trampoline page 270, and entry point page 280. FIG. 2 further shows the access permissions associated with each of the memory pages in each of default view 210, trampoline view 220, and alternative view 230.

Guest code and data pages may have universal access permissions in default view 210 and limited access permissions in other views. The physical address of the VMFUNC page tables 250 may be stored by the upper 20 bits of CR3 control register (also referred to as the page directory base register (PDBR)) of the virtual processor associated with the virtual machine. VMFUNC page tables 250 may have read-only access permissions in default view 210 and read/write access permissions in trampoline view 220.

First trampoline page 260, which is executable from default view 210, may comprise unprotected (i.e., guest-modifiable) guest-executable code and guest data. Second trampoline page 270, which is executable from trampoline view 220, may comprise protected guest-executable code to perform certain integrity checks of the guest page table hierarchy. Entry point page 280, which is executable from alternative view 230, may comprise protected guest-executable code which may be employed to perform certain tasks (e.g., exit-less communication with a peer virtual machine).

Figure 3:
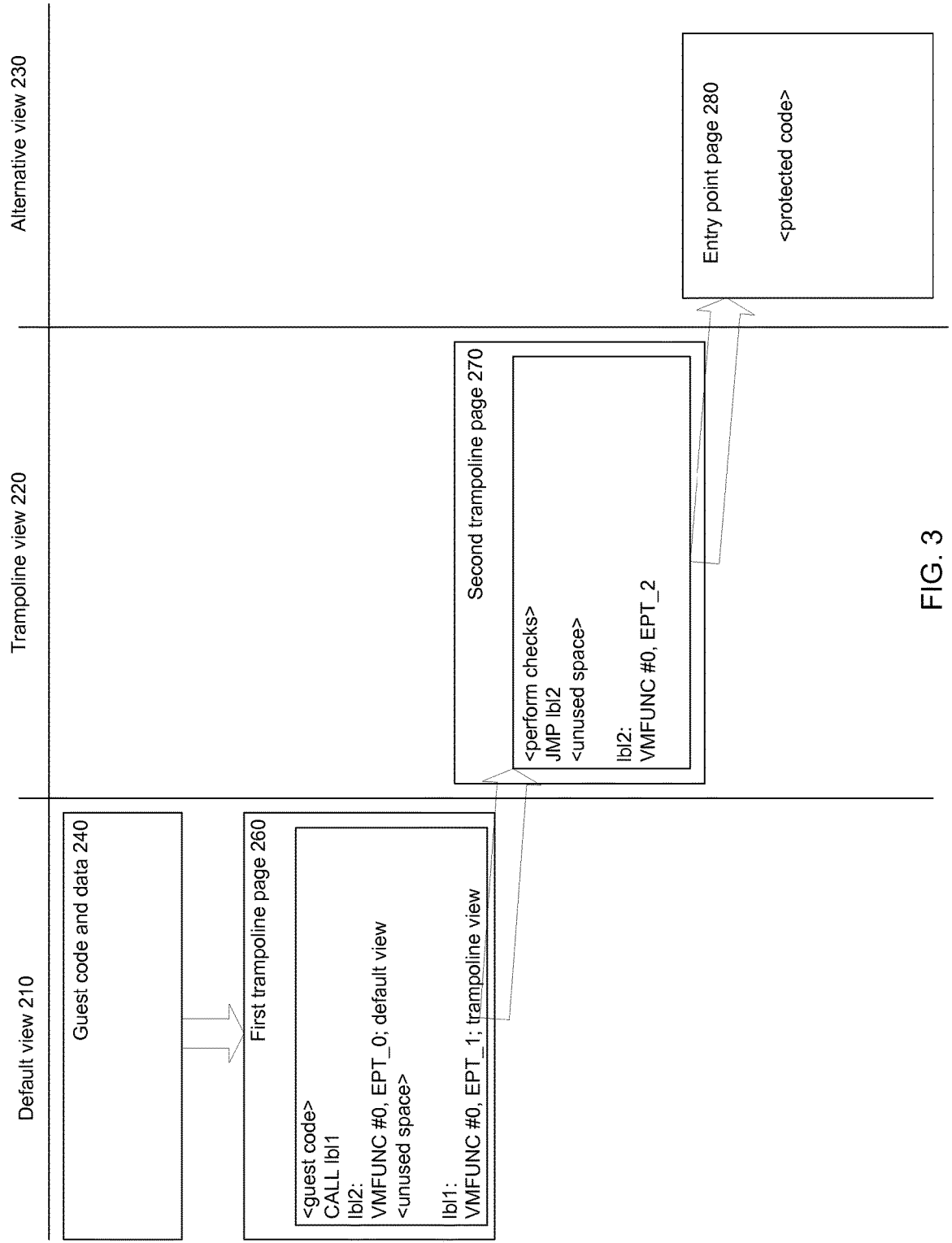
FIG. 3 schematically illustrates several memory pages mapped into various virtual machine views and the flow of code execution in accordance with one or more aspects of the present disclosure.

FIG. 3 schematically illustrates several memory pages mapped into various virtual machine views and the flow of code execution in accordance with one or more aspects of the present disclosure. As schematically illustrated by FIG. 3, first trampoline page 260, which is executable from default view 210, may comprise unprotected (i.e., guest-modifiable) guest-executable code and guest data. The last instruction of first trampoline page 260 may be a VM function invocation instruction to switch the extended page table pointer (EPTP) value, and thus to transition to trampoline view 220.

Second trampoline page 270, which is executable from trampoline view 220, may comprise protected guest-executable VM function code to validate a base address of a root of the virtual machine page table hierarchy. The VM function may have only one writable memory page, which is the memory page storing the page directory. The physical address of the first page directory entry is stored by the upper 20 bits of CR3 control register (also referred to as the page directory base register (PDBR)) of the virtual processor associated with the virtual machine. The value of the CR3 used in the VM function, together with a virtual address corresponding to the root of the page tables (PML4) may be passed to the hypervisor through a hypercall.

The VM function may execute a dummy write instruction to the virtual address passed to the hypercall (e.g., exclusive disjunction XOR [virtual address], 0). Since exactly one page is writable in the trampoline view, the dummy write instruction would fail is the guest has done unanticipated modifications to the writable page.

Once the dummy write is complete, further checks on the contents on the writable page may be performed from the verified root. In an illustrative example, the VM function may read an entry in the page pointed to by CR3 to the virtual address space of the VM function. In another illustrative example, the VM function may ascertain that the entry points to a page which is not writable in the default view.

Upon completion of the integrity checks, the VM function may invoke another VM function by executing the last instruction of second trampoline page 270, which is a VM function invocation instruction to switch the extended page table pointer (EPTP) value, and thus transition to the alternative view.

Entry point page 280, which is executable from alternative view 230, may comprise protected guest-executable code which may be employed to perform certain tasks (e.g., exit-less communication with a peer virtual machine).

In certain implementations, trampoline view 220 and trampoline pages 260, 270 may be shared by two or more virtual machines, while each virtual machine may have its own entry point page 280 and own alternative view 230.

Figure 4:
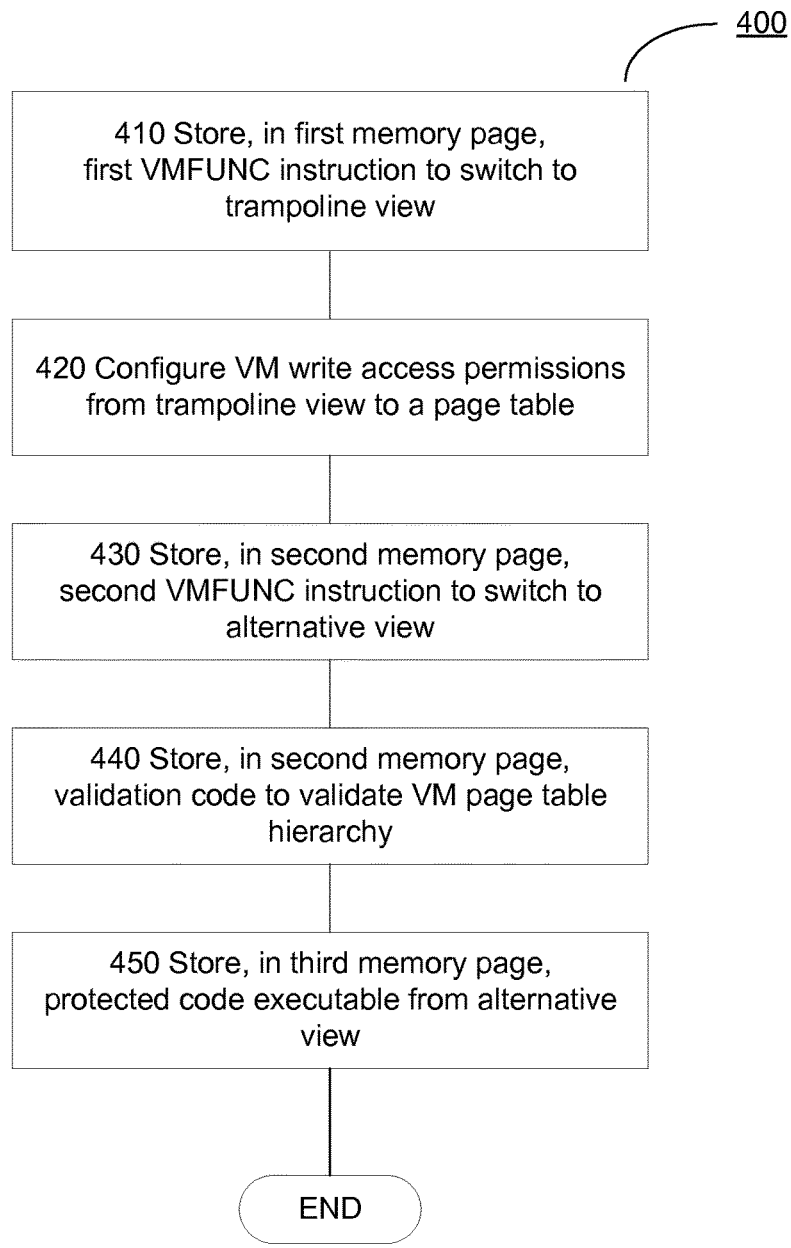
FIG. 4 depicts a flow diagram of a method for guest page table validation by virtual machine functions, in accordance with one or more aspects of the present disclosure.

FIG. 4 depicts a flow diagram of one illustrative example of a method 400 for guest page table validation by virtual machine functions, in accordance with one or more aspects of the present disclosure. Method 400 and/or each of its individual functions, routines, subroutines, or operations may be performed by one or more processing devices of the computer system (e.g., host computer system 100 of FIG. 1)

implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device of a host computer system implementing the method may store, in a first memory page being executable from a default memory view of a virtual machine, a first virtual machine function invocation instruction, such that executing the first virtual machine function invocation instruction switches a page table pointer to a trampoline memory view of the virtual machine, as described in more details herein above.

At block 420, the processing device may configure a write access permission, from the trampoline memory view, to a page table comprised by the virtual machine page table hierarchy, as described in more details herein above.

At block 430, the processing device may store, in a second memory page being executable from the trampoline memory view, a second virtual machine function invocation instruction, such that executing the second virtual machine function invocation instruction switches the page table pointer to an alternative memory view of the virtual machine, as described in more details herein above.

At block 440, the processing device may store, in the second memory page, validation instructions to validate the virtual machine page table hierarchy, as described in more details herein above.

At block 450, the processing device may store, within a third memory page being executable from the alternative memory view, instructions to execute certain protected code (e.g., to access a host memory allocated to a peer virtual machine for exit-less communications with the peer virtual machine), as described in more details herein above. Upon completing the operations referenced by block 450, the method may terminate.

Figure 5:
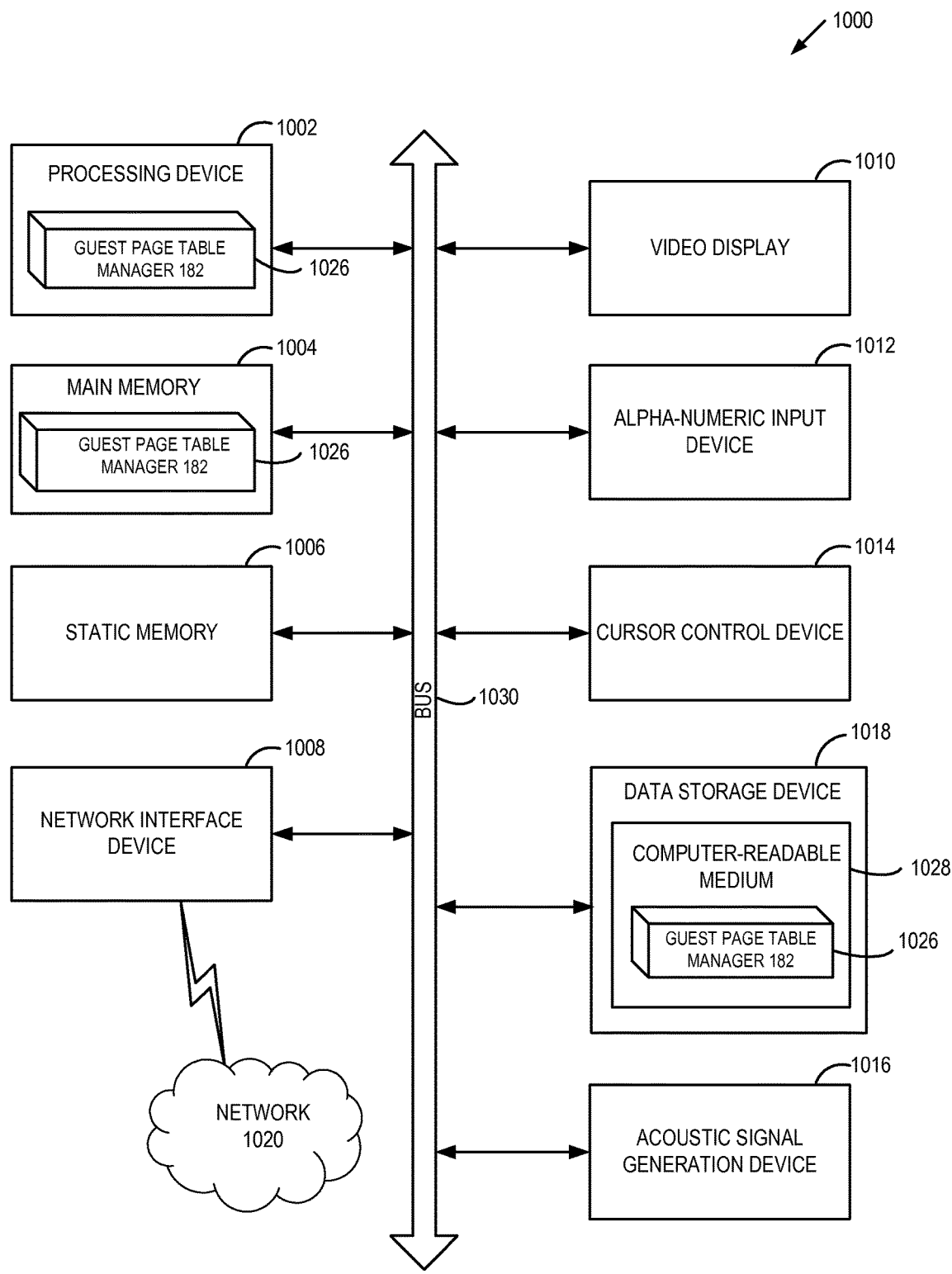
FIG. 5 depicts a block diagram of an example computer system operating in accordance with one or more aspects of the present disclosure.

FIG. 5 schematically illustrates a component diagram of an example computer system 1000 which can perform any one or more of the methods described herein. In various illustrative examples, computer system 1000 may represent host computer system 100 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute guest page table manager component 182 implementing method 300 for guest page table validation by virtual machine functions.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of guest page table manager component 182 implementing method 300 for guest page table validation by virtual machine functions.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   configuring, by a processing device of a host computer system, a default memory view associated with a first virtual machine, a trampoline memory view associated with the first virtual machine, and an alternative memory view associated with the first virtual machine, wherein the first virtual machine is allowed to a execute guest code from the default memory view and is further allowed to execute a protected code from the alternative memory view;
   allocating a first memory page, a second memory page, and a third memory page within a first contiguous memory address range of the default memory view, such that the first memory page, the second memory page, and the third memory page occupy a second contiguous memory address range within the trampoline memory view and further occupy a third contiguous memory address range within the alternative memory view;
   storing, in the first memory page executable by the first virtual machine using the default memory view, a first instruction to invoke a virtual machine function, wherein executing the first instruction switches a page table pointer to the trampoline memory view of the first virtual machine;
   configuring a write access permission, from the trampoline memory view, to a page table comprised by a page table hierarchy of the first virtual machine;
   storing, in the second memory page executable by the first virtual machine using the trampoline memory view, a second instruction to invoke the virtual machine function, wherein executing the second instruction switches the page table pointer to the alternative memory view of the first virtual machine;
   storing, in the second memory page, validation instructions to validate the page table hierarchy; and
   storing the protected code within the third memory page executable by the first virtual machine using the alternative memory view, wherein the protected code is executable by the first virtual machine to communicate with a second virtual machine running on the host computer system.

2. The method of claim 1, wherein the page table pointer is provided by an Extended Page Table Pointer (EPTP).

3. The method of claim 1, wherein the validation instructions comprise an instruction to perform a dummy write operation to the root of the page table hierarchy.

4. The method of claim 1, wherein the first instruction is stored as a last instruction within the first memory page.

5. The method of claim 1, wherein the second instruction is stored as a last instruction within the second memory page.

6. The method of claim 1, wherein the second memory page is not accessible from the default memory view.

7. The method of claim 1, further comprising:
   mapping the first memory page, the second memory page, and the third memory page into address spaces of two or more virtual machines being executed by the host computer system.

8. The method of claim 1, wherein the trampoline view has only one writable memory page represented by a memory page storing the page table hierarchy of the first virtual machine.

9. A system comprising:
a memory; and
a processing device, operatively coupled to the memory, to:
configure a default memory view associated with a first virtual machine, a trampoline memory view associated with the first virtual machine, and an alternative memory view associated with the first virtual machine, wherein the first virtual machine is allowed to a execute guest code from the default memory view and is further allowed to execute a protected code from the alternative memory view;
allocate a first memory page, a second memory page, and a third memory page within a first contiguous memory address range of the default memory view, such that the first memory page, the second memory page, and the third memory page occupy a second contiguous memory address range within the trampoline memory view and further occupy a third contiguous memory address range within the alternative memory view;
store, in the first memory page executable by the first virtual machine using the default memory view, a first instruction to invoke a virtual machine function, wherein executing the first instruction switches a page table pointer to the trampoline memory view of the first virtual machine;
store, in the second memory page executable by the first virtual machine using the trampoline memory view, a second instruction to invoke the virtual machine function, wherein executing the second instruction switches the page table pointer to the alternative memory view of the first virtual machine;
store, in the second memory page, validation instructions to validate a page table hierarchy of the first virtual machine; and
store the protected code within the third memory page executable by the first virtual machine using the alternative memory view, wherein the protected code is executable by the first virtual machine to communicate with a second virtual machine running on the system.

10. The system of claim 9, wherein the processing device is further to:
configure a write access permission, from the trampoline memory view, to a page table comprised by the page table hierarchy.

11. The system of claim 9, wherein the page table pointer is provided by an Extended Page Table Pointer (EPTP).

12. The system of claim 9, wherein the validation instructions comprise an instruction to perform a dummy write operation to the root of the page table hierarchy.

13. The system of claim 9, wherein the first instruction is stored as a last instruction within the first memory page.

14. The system of claim 9, wherein the second instruction is stored as a last instruction within the second memory page.

15. The system of claim 9, wherein the trampoline view has only one writable memory page represented by a memory page storing the page table hierarchy of the first virtual machine.

16. A computer-readable non-transitory storage medium comprising executable instructions to cause a processing device of a host computer system to:
configure a default memory view associated with a first virtual machine, a trampoline memory view associated with the first virtual machine, and an alternative memory view associated with the first virtual machine, wherein the first virtual machine is allowed to a execute guest code from the default memory view and is further allowed to execute a protected code from the alternative memory view;
allocate a first memory page, a second memory page, and a third memory page within a first contiguous memory address range of the default memory view, such that the first memory page, the second memory page, and the third memory page occupy a second contiguous memory address range within the trampoline memory view and further occupy a third contiguous memory address range within the alternative memory view;
store, by the processing device, in the first memory page executable by the first virtual machine using the default memory view, a first instruction to invoke a virtual machine function, wherein executing the first instruction switches a page table pointer to the trampoline memory view of the first virtual machine;
configure a write access permission, from the trampoline memory view, to a page table comprised by a page table hierarchy of the first virtual machine;
store, in the second memory page executable by the first virtual machine using the trampoline memory view, a second instruction to invoke the virtual machine function, wherein executing the second instruction switches the page table pointer to the alternative memory view of the first virtual machine;
store, in the second memory page, validation instructions to validate the page table hierarchy; and
store the protected code within the third memory page executable by the first virtual machine using the alternative memory view, wherein the protected code is executable by the first virtual machine to communicate with a second virtual machine running on the host computer system.

17. The computer-readable non-transitory storage medium of claim 16, wherein the validation instructions comprise an instruction to perform a dummy write operation to the root of the page table hierarchy.

18. The computer-readable non-transitory storage medium of claim 16, wherein the first instruction is stored as a last instruction within the first memory page.

19. The computer-readable non-transitory storage medium of claim 16, wherein the second instruction is stored as a last instruction within the second memory page.

20. The computer-readable non-transitory storage medium of claim 14, wherein the trampoline view has only one writable memory page represented by a memory page storing the page table hierarchy of the first virtual machine.

* * * * *